US008014994B2

(12) United States Patent
Hader et al.

(10) Patent No.: US 8,014,994 B2
(45) Date of Patent: Sep. 6, 2011

(54) SIMULATION BUSINESS OBJECT FOR SERVICE ORIENTED ARCHITECTURE

(75) Inventors: Sven Hader, Wiesloch (DE); Andreas Huber-Buschbeck, Heiligkreuzsteinach (DE); Thomas Roesch, Sandhausen (DE)

(73) Assignee: SAP AG, Walldorf (DE)

( * ) Notice: Subject to any disclaimer, the term of this patent is extended or adjusted under 35 U.S.C. 154(b) by 605 days.

(21) Appl. No.: 11/849,145

(22) Filed: Aug. 31, 2007

(65) Prior Publication Data

US 2009/0063112 A1  Mar. 5, 2009

(51) Int. Cl.
*G06F 9/45* (2006.01)
*G06G 7/48* (2006.01)

(52) U.S. Cl. ............................................ 703/22; 703/6

(58) Field of Classification Search .................. 703/6, 22
See application file for complete search history.

(56) References Cited

U.S. PATENT DOCUMENTS

| 5,689,706 | A  | * | 11/1997 | Rao et al. ........................ 707/201 |
| 6,233,585 | B1 |   | 5/2001  | Gupta et al. |
| 6,792,605 | B1 | * | 9/2004  | Roberts et al. ................. 719/313 |
| 6,799,188 | B2 |   | 9/2004  | Weedon |
| 6,882,951 | B2 | * | 4/2005  | Eden et al. ..................... 702/121 |
| 7,020,574 | B2 | * | 3/2006  | Eden et al. ..................... 702/122 |
| 7,194,535 | B2 | * | 3/2007  | Hannel et al. .................. 709/224 |
| 7,219,110 | B2 |   | 5/2007  | He |
| 7,302,370 | B2 | * | 11/2007 | Nickerson et al. ................. 703/6 |
| 2003/0088664 | A1 | * | 5/2003 | Hannel et al. .................. 709/224 |
| 2003/0105884 | A1 | * | 6/2003 | Upton ............................. 709/318 |
| 2005/0038828 | A1 | * | 2/2005 | Kaluskar et al. ............... 707/200 |
| 2005/0251527 | A1 | * | 11/2005 | Phillips et al. ................. 707/101 |
| 2007/0239797 | A1 |   | 10/2007 | Cattell et al. |

OTHER PUBLICATIONS

Harold, Obscuring XML, Extreme Markup Languages, 2005.*
Helmer et al, Isolation in XML Bases, 2001, Universität Mannheim.*
Bianchin, D. H.: Implementing a Distributed Two-Phase-Commit Scenario with Web Services and SAP NetWeaver PI 7.1 SAP Developer Network, Business Process Expert Community; copyright SAP AG 2007; 11 pages.

* cited by examiner

*Primary Examiner* — Dwin M Craig
*Assistant Examiner* — Aniss Chad
(74) *Attorney, Agent, or Firm* — Blakely Sokoloff Taylor & Zafman LLP

(57) ABSTRACT

Methods and apparatuses enable creating a stateful simulation process with stateless messages. A stateless message instantiates a simulation object for a system to be simulated. The simulation object is identified by an identifier. Activity request messages, which are stateless, identify the simulation object identifier and can thus be associated with the simulation object. Results of execution of requested activities are stored in the simulation object, and thus persisted in the simulation object. In one embodiment, the persisting of simulation results in the simulation object allows the simulation data to be isolated from the active system data. In one embodiment, results of the execution of the simulation are merged in whole or in part with the active backend data.

20 Claims, 4 Drawing Sheets

SIMULATION BUSINESS OBJECT FOR SERVICE ORIENTED ARCHITECTURE

FIELD

Embodiments of the invention relate to business system simulation, and more particularly to a simulation business object for business system simulation.

BACKGROUND

Enterprise systems are frequently tested to determine how changes to a system will affect its performance. The testing can be accomplished with simulations, where an application related to the system is executed, and data is input to determine how the system will perform. Previous simulation mechanisms worked relatively well for monolithic enterprise system architectures. However, enterprise systems increasingly employ a service-oriented architecture (SOA) where data access is enabled via services. An SOA in an enterprise context may frequently be referred to as an enterprise services architecture (ESA).

Traditional ESA restricts services to be stateless. In contrast to the monolithic system that monitored each separate action or access to a system, traditional ESA may require that each transaction be self-contained. The state of the transaction may not be persisted in the system. Thus, simulation within an ESA system is very commit-based. Simulations must either be limited to a single logical unit of work (e.g., a single activity, a single request), or requests must be executed and changes made to the backend, which then must be undone if it is decided that the changes made in the simulation are not to be kept. Such a setup is very inconvenient seeing that many simulations are intended to last a relatively short period of time (on the order of minutes). A lot of time and effort is traditionally spent to deal with the limitations in simulating within an enterprise employing SOA. There is currently no logical mechanism to link simulation activities in an SOA architecture. Additionally, even if linking of the simulation activities were possible, previous simulation techniques had predefined sequences of events or simulation activities to follow. The predefined sequences resulted in a significant lack of flexibility in simulation.

SUMMARY

In one embodiment, a stateless message instantiates a simulation object for a system. The simulation object is employed to create a stateful simulation process, even though the simulation process is executed with stateless messages. A stateless message instantiates the simulation object for the system to be simulated. The simulation object is identified by an identifier, which is referenced by the stateless messages. The stateless messages, such as activity request messages, can be associated with the simulation object, and thus associated with each other. Results of execution of activities requested via the request messages are stored in the simulation object, and thus persisted in the simulation object. The end result is a stateful simulation process where the results can be saved to the backend, or discarded. In one embodiment, the persisting of simulation results in the simulation object allows the simulation data to be isolated from the active system data.

In one embodiment, the activity request messages reference the simulation object by placing the simulation object identifier in a business scope field of a message header. The business scope identifies the message with the simulation object. The simulation object has an expected lifecycle longer than the message, which can effectively lengthen the lifecycle of the message to that of the simulation object. The simulation activities need not be performed in an order predefined by a protocol. Rather, they can be performed in an order that makes sense for the simulation process, but otherwise may be considered random.

In one embodiment, the simulation object is isolated from active backend data of the backend data system for which the simulation is being performed. Isolating the simulation object can provide a separation between active data and the simulation data. Thus, the simulation data can be manipulated independently of the active data.

When a simulation is completed, the results of the simulation can be optionally merged into a backend data system. Merging the simulation results may include determining whether there are resources available in the backend system to implement the simulated changes in the backend system. In one embodiment, merging the results involves merging the results to the extent there are resources available to implement the simulated changes. Thus, changes may be merged in their entirety, or merged in part. Additionally, changes may simply be discarded, and the simulated changes deleted from the system without changing the backend system at all. The flexibility achieved by such an approach allows for the merging of some changes without requiring the simulation to be started over from the beginning if a particular change is not available.

In one embodiment, the simulation object has an associated time to live (TTL). When the TTL is exceeded, the simulation object can be deleted, and the simulated changes discarded. In one embodiment, the system creates a snapshot of global data of the backend system at the time of creation of the simulation object. Furthermore, performing activities as requested in the activity request messages may involve executing the activity on the snapshot. Thus, the simulation object may be completely isolated from the active data, and the simulation need not affect the active system data.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Figure 1:
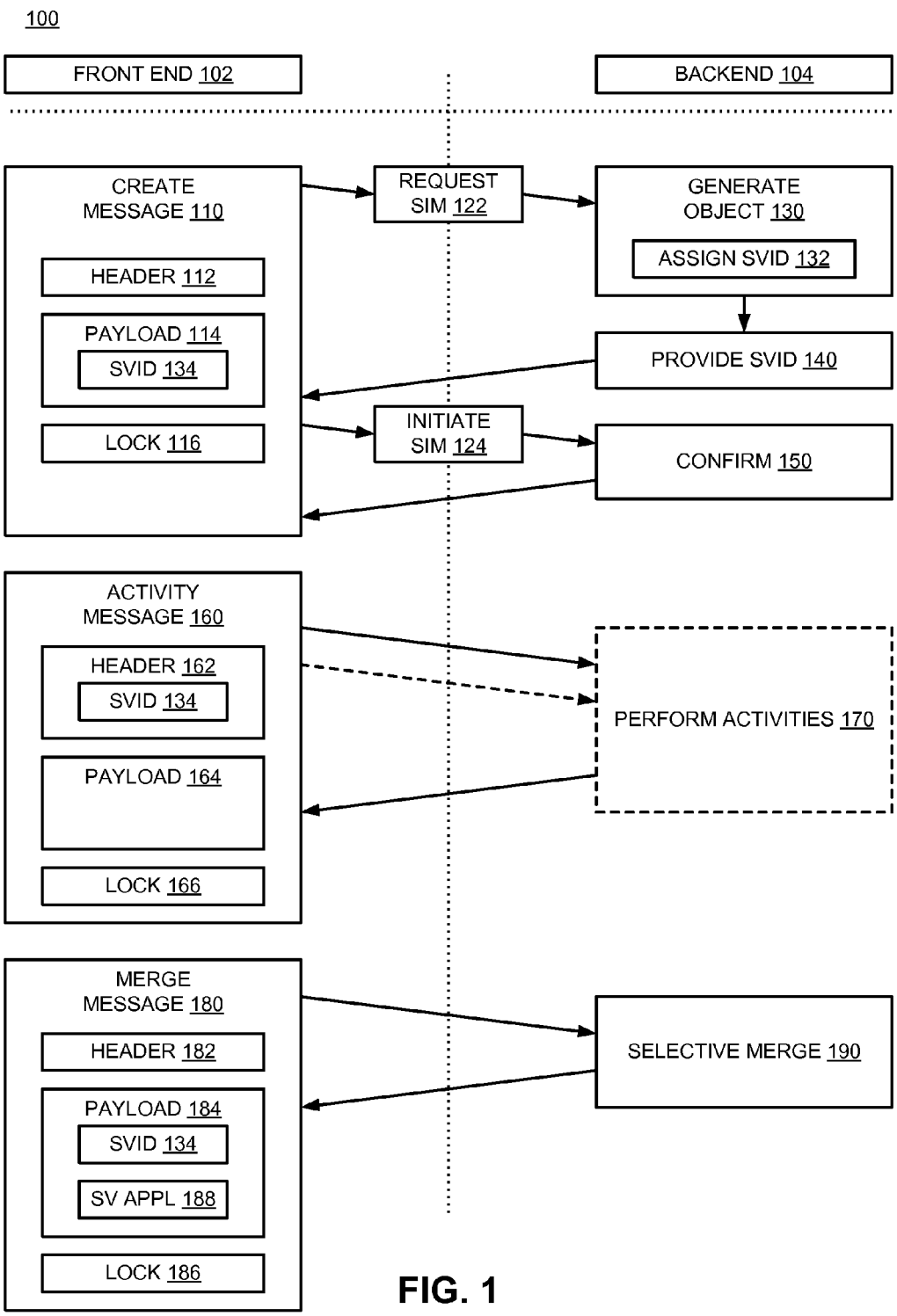
FIG. 1 is a block diagram of an embodiment of a simulation process between a front-end and a backend.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

Methods and apparatuses enable a simulation object that can provide a stateful simulation process in an SOA architecture with stateless messages. The simulation object is instantiated responsive to a stateless message. The simulation object is referenced by activity request messages that execute the simulation. The request messages are stateless, but reference the simulation object by a business context identifier associated with the simulation object. Results of execution of the activities are stored in the simulation object, and thus persisted in the simulation object. The persisting of simulation information in the simulation object provides a stateful simulation process.

Processes executed by service access in an enterprise SOA (eSOA) are by default stateless. The service consumer of the eSOA processes an atomic functionality by calling a service from a service provider without modifying data or saving transactional data buffers beyond the duration of the service call. As used herein, an atomic functionality refers to an elemental functionality in the enterprise (e.g., inventory lookup for a specific part) provided by an enterprise service provider. Because the system does not retain data beyond the duration of the service call or service request, transaction state is not shared between separate logical units of work (e.g., inventory lookup for the specific part, production proposal for the specific part). Thus, previously known stateful transactional simulations are not possible in the eSOA. A simulation process involving several different service operations in eSOA traditionally required transactional data to be stored from the service provider for the duration of several service calls.

In one embodiment, an enterprise service is provided that begins a transactional simulation and opens a business scope by instantiating a simulation object with an identifier associated with the business scope. Then, subsequent service requests that are to be part of the transaction simulation reference the identifier to fall within the business scope of the simulation object. Thus, the subsequent service requests that fall within the business scope of the simulation object are processed within the same business scope. In one embodiment, the business scope is isolated from other business scopes. That is, other processes, whether simulation processes or actual transactional processes, may be unable to "see" or access the changes executed within the business scope.

In contrast to traditional systems, the sequence of services need not be in a predefined order or sequence with the simulation object. The order of execution of the services is not as restricted when state can be maintained. The service requests can result in reading and writing operations to data that is persisted with the business context of the simulation object. In one embodiment, the changes generated within the business context and stored in the simulation object are optionally merged to a system database. Merging the changes to the database may be based at least in part on the availability of resources to make the changes. For example, if a simulation requests shipping 100 units of a product, but only 83 are available, the changes may not be merged at all (discarded), or may be merged in part (e.g., up to 83 may be shipped).

In one embodiment, multiple instances of simulation objects could exist in parallel in a backend system. In one embodiment, each instance of a simulation object has a unique identifier. Each instance may thus have its own business context as identified by its unique identifier.

In one embodiment, a simulation object may be terminated in one of multiple ways. For example, a simulation object may have an associated time to live (TTL) or other timeout mechanism. The simulation object can be automatically deleted, including any data associated with the simulation object and any activities executed within its business context, when the lifetime of the simulation object is reached or exceeded. Thus, a simulation object and an associated transaction simulation can die automatically after a predefined time with no access from an outside service. As another termination example, a simulation object may be explicitly canceled. That is, the system may include a service that deletes a simulation object. As another termination example, a simulation object may be implicitly canceled. That is, a simulation object can be canceled responsive to another activity in the system, such as merging a simulation object, or resetting the system. When a simulation object is closed or canceled, the business scope is also closed, and reference to an identifier of a closed simulation object may result in an error or an error handling routine.

In one embodiment, a copy or a snapshot of the system data is made in conjunction with or responsive to the creation of a simulation object. Thus, the business context of the simulation object may be restricted to a copy of system data, which can be separate from active system data. Services can be executed on the copy of the data, and changes save through a merge process.

As an example application of a transaction simulation, consider an SNP (supply network planning) planner. The planner may determine to simulate orders. The planner can instantiate a simulation object for the order simulation. The planner generates one or more simulated orders and runs processes on the orders. The simulations do not affect the active data of the backend system. The planner may then initiate a commit request, which triggers a merge process to merge as much of the simulation as possible. Ideally for the planner, the entire simulation will be merged.

FIG. 1 is a block diagram of an embodiment of a simulation process between a front-end and a backend. System 100 includes front end 102 and backend 104. Front end 102 represents a computing device that interfaces one or more enterprise servers. Backend 104 represents the one or more enterprise servers. Hardware for front end 102 may be embodied in a desktop or laptop computer, a workstation, a handheld device, etc. The hardware includes a network interface to communicate over a network to backend 104. Hardware for backend 104 may include one or more devices, including rack-mounted hardware device (e.g., processing blades, storage devices). Backend 104 includes one or more databases or storage systems for storing data in a non-volatile manner (e.g., the state of data is maintained even when power is interrupted to the system). Backend 104 also includes one or more memory device, which may include volatile memory (e.g., random access memory (RAM)) and/or nonvolatile memory (e.g., Flash) for temporary storage of data, instructions, code, etc.

Front end 102 executes one or more software applications, which enable a user to perform operations on data of backend 104. The operations may include accessing, modifying, storing, and deleting. The operations may affect data in memory and/or storage of backend 104. For purposes of discussion herein, front end 102 is understood to enable the execution of a simulation of a backend system. Backend 104 may include one or more systems, such as a financial system, an engineering system, a supply network planning system, etc. Each backend system may have one or more associated applications. Thus, a simulation may be performed for a financial system application, an engineering system application, a planning application or planning system application (e.g., a supply network planning system application, a supply chain management system application), etc. One or more simulations could be executed simultaneously (e.g., in parallel) for each system, and/or for multiple different systems. Note that certain simulations may invoke multiple backend systems.

A simulation may be invoked by front end 102 generating a request simulation message 122 via create message 110. Request simulation message 122 represents a stateless request that triggers the instantiation of a simulation object. Thus, backend 104 performs a generate object action 130, to instantiate a simulation object as requested. The simulation object may be generated (instantiated) in memory from a data object stored in a database. As part of generating the object, backend 104 may perform an assign SVID (simulation version identifier) action 132 to create SVID 134. As used herein, a simulation version refers to a simulation object; that is, an object that is instantiated for the purpose of a simulation (which may or may not be merged into active backend data). Thus, a "simulation version" is created initially as an object that is not an "active version," or an object instance that will necessarily affect the backend data. The SVID may be assigned through normal identifier/handle routines of the backend system. In one embodiment, a global simulation version ID generator may generate and track what IDs have been used. Backend 104 performs a provide SVID operation 140 to send SVID 134 to front end 102. Provide SVID operation 140 provides the SVID, which front end 102 can then use to instantiate a simulation process with instantiate simulation request 124. Instantiate simulation request 124 may create a simulation process for the generated simulation object. The simulation process will depend upon the system for which the simulation is being executed. In one embodiment, request simulation message 122 triggers both creation of the simulation object, and generation of the simulation process that references the simulation object. Provide SVID 140 may include the generation of a confirmation message to the front end, confirming the execution of the requested create simulation operation.

With SVID 134 to define a business context for the simulation, front end 102 can then generate any of a number of messages, including activity requests, to have operations performed on data associated with the simulation. In one embodiment, not only do such operations have no effect on active business data, but the operation results may be inaccessible to other processes that access the backend system.

Create message 110 includes header 112, which may be a standard header for the communication protocol between front end 102 and backend 104. Payload 114 represents the body of the message, and includes SVID 134 when requesting creation of the simulation process that uses the simulation object. That is, create message 110 sends the SVID in the body of the message to create a simulation process for the identified simulation object. The SVID then represents the scope of the simulation process, and the simulation object becomes the container for the simulation transaction (e.g., it stores the state of the data for the transaction). In one embodiment, messages from front end 102 to backend 104 include a lock to lock to a resource while an action is being executed, which prevents other requests or messages from affecting the resource until the action is complete. Thus, create message 110 may include lock 116.

Create message 110 is sent to backend 104, where the backend receives and processes the message, including extracting any data and actions from payload 114. Create message 110 includes an explicit or implicit request to create the simulation process, which request is confirmed by confirm action 150. In one embodiment, confirm action 150 indicates the initiation of the simulation process. There may be parameters associated with the simulation, such as time limits, memory allocation, etc., which can be provided via a confirmation of the request.

With an active simulation, front end 102 can generate any of a number of activity messages 160. Activity message 160 represents any type of service or activity request for backend 104 related to the simulation, including actions that affect the state of data in the backend system (or an isolated copy of such data). Activity messages need not occur in any particular order. That is, previous simulation protocols often required activity requests to be performed in a particular order, or occur in a particular sequence. As described herein, each request is associated with the business context of the simulation object, and the order of the requests is less significant. Other than opening and closing the simulation, simulation requests may occur in any sequence. Activity message 160 includes header 162, which may include reference to the simulation object with SVID 134. Reference in the header to SVID 134 can indicate that the message is related to an activity to occur within the business context of SVID 122. Activity message 160 includes payload 164, which will indicate the activity to be performed, as well as indicating any data or parameters necessary to carry out the activity for the simulation. Activity message 160 may also include lock 166.

In response to activity message 160, backend 104 generates actions to perform activities 170. The actions include any type of service that may be related to a transaction in the system. Note that multiple activity messages 160 can be sent and executed. Each activity message can be considered to be a logical unit of work, where the cumulative work is the simulation transaction. Thus, there is a dashed arrow pointing back to activity message 160 from perform activities 170 to represent the potential repetitive nature of the activity messages and performance that may occur. Each activity is confirmed, and a new activity can be performed, or an action requested to merge or end the simulation.

After the activities are performed, front end 102 may optionally send merge message 180 to merge the simulation data with the active data of the backend system. Note that a simulation could simply be closed with a termination message (not shown), or the front end could simply stop sending activity messages, which may result in a termination of the simulation after a threshold period of time.

If the data is to be merged, front end 102 sends merge message 180 to backend 104. Merge message 180 includes header 182 to identify the message type. Payload 184 includes SVID 134 to reference the simulation object to where the updates or data changes are stored or persisted in backend 104 for the simulation. Payload 184 also includes simulation version application (SV appl) 188, which indicates the application for which the simulation was being executed. Merge message 180 may also include lock 186.

In one embodiment, there is only a single merge message type; that is, front end 102 cannot determine to merge all or merge part. Such a determination may be made by backend 104. As illustrated, backend 104 may include selective merge action 190 to perform a selective merge when a merge is requested. A selective merge determines what changes are able to be merged, and merges whatever can be merged. In some cases, the selective merge will determine that all changes can be merged, and such would be implemented. In other cases, only part of the changes can be merged. Where only part of the changes can be merged, the system merges the changes that can be merged, and the remaining changes are discarded. Selective merging is discussed in more detail below with respect to FIG. 3.

Figure 2:
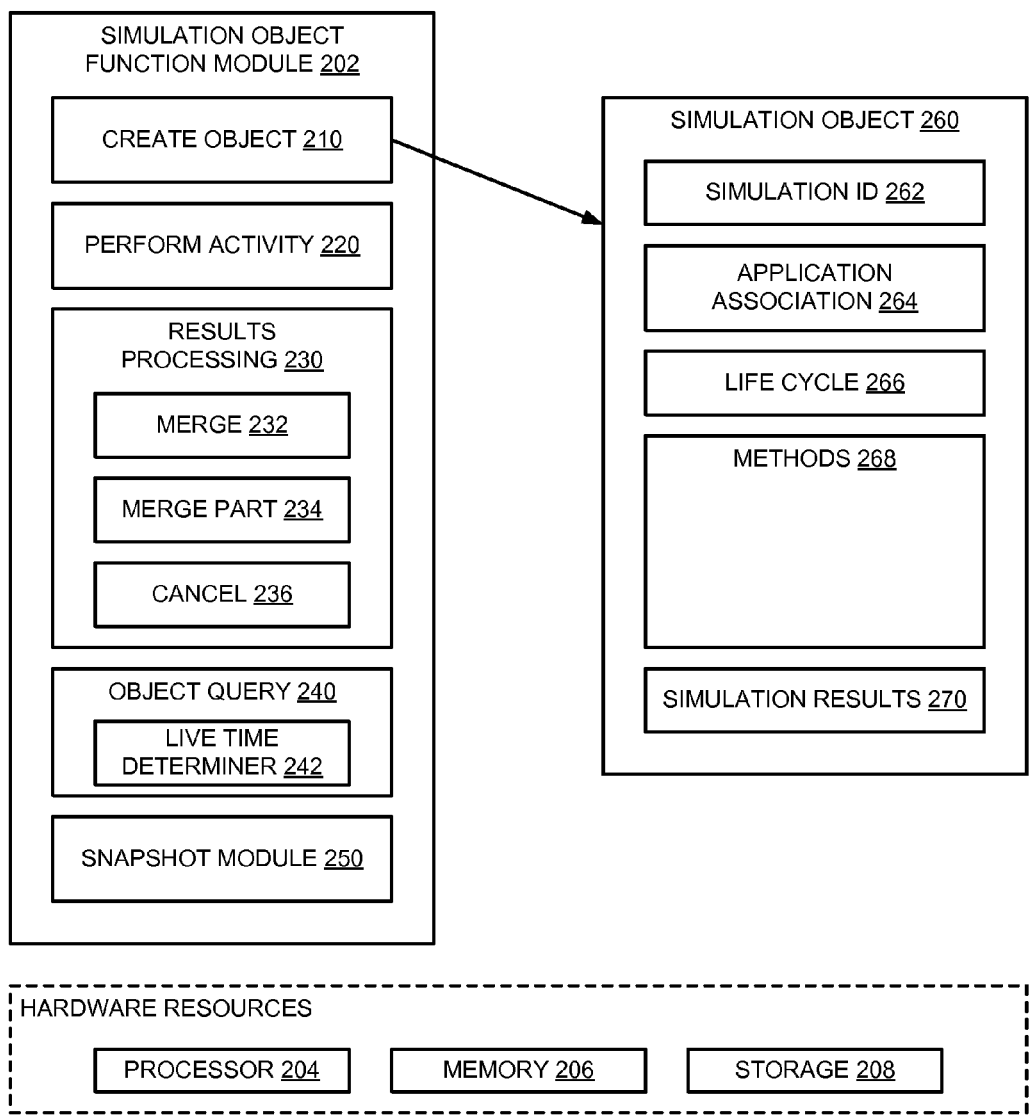
FIG. 2 is a block diagram of an embodiment of a system having a simulation object function module.

FIG. 2 is a block diagram of an embodiment of a system having a simulation object function module. System 200 includes hardware resources that provide the operating platform for system 200. The hardware resources may include processor 204, memory 206, and storage 208. Other hardware resources may also be present (e.g., network interface components). Processor 204 may include any type of processor, whether general purpose (e.g., central processing unit (CPU), microprocessor, microcontroller, programmable device, etc.) or special purpose (e.g., application specific integrated circuit (ASIC)). Memory 206 may include RAM or flash, or some combination. Simulation objects may be instantiated in memory 206. Storage 208 may include any one or more (including combinations) devices of any storage technology such as optical, semiconductor, magnetic, etc. Storage 208 may include one or more system databases. Simulation results or data changes can be stored in storage 208. In one embodiment, system 200 is a standalone device that provides simulation functionality as described herein. Alternatively, system 200 could be executed on one or more aspects of a computing device.

Simulation object function module 202 (hereinafter module 202) represents hardware and/or software components that provide functionality related to creating, managing, and operating on simulation objects. Module 202 may include a number of functional blocks or modules, some of which may include create object 210, perform activity 220, results processing 230, and object query 240. Other functional blocks/modules could be included. Not all functionalities discussed herein are necessary in every implementation of module 202. Although the functionality of module 202 may generally be embodied in components of a backend system, one or more, or all, components may exist in an enterprise system other than in a backend system.

Create object block 210 enables module 202 to create a simulation object and a simulation transaction. Simulation object 260 represents a simulation object as created by create object block 210. Create object block 210 may receive a request to initiate a simulation transaction, and create simulation object 260. Simulation object 260 can be instantiated in memory 206. Create object block 210 can be considered to initiate a simulation process responsive to a request for simulation. Creation of simulation object 260 includes generating or obtaining simulation ID 262, which is an identifier for simulation object 260.

In one embodiment, create object block 210 generates a unique business context isolated from other processes that may execute within the system to be simulated. The unique business context may refer to having data associated with simulation object 260 being inaccessible and potentially not visible to other processes. When the business context is unique, simulation activities can be executed without affecting active data, or the data that represents a current state of a backend system. Not only may data be isolated from other processes, but activity results can be obscured from the other processes. Thus, changes to the data may not be available to other processes executing on the backend system.

Perform activity block 220 enables module 202 to receive a stateless message requesting execution of a simulation activity, and execute the requested activity responsive to the request. Perform activity block 220 may also store results of the simulation activity in simulation object 260. For example, simulation results 270 represent results generated via execution of simulation activities (e.g., the performing of services in the system). Simulation results 270 include changes or updates of data as compared to system data as it was at the beginning of the simulation. Note that simulation results 270 may include new data, updated data, as well as simply being difference parameters to be incorporated into existing data to update the data.

In addition to simulation ID 262 and simulation results 270, simulation object 260 is illustrated with other components. In one embodiment, simulation object 260 includes application association 264, which represents a relationship or association of the simulation object with a backend system for which a simulation will be executed. The association identifies what data in the backend storage is affected by simulation processes. Life cycle 266 represents one or more parameters that identify a live time or a TTL for simulation object 260. That is, simulation object 260 may have an associated time limit or expiration period. If the life cycle expires, the simulation object is closed, and its data can be purged from memory, including simulation results 270. Thus, simulation results can expire without being written to a backend system. Methods 268 represent methods or processes that can be executed on the data object. Methods 268 can be understood from one perspective as the data object interfaces, which define how to access simulation object 260 or execute an action on the simulation object.

In one embodiment, results processing block 230 enables module 202 to optionally merge results of a simulation into the active data of the backend system. Thus, the state of data for the backend system can be affected by changes made in the simulation. In one embodiment, results processing block 230 determines an amount of the stored results to merge into the backend data system. That is, some, all, or none of the simulation results may be merged into the backend data system. The determination of whether to merge some, all, or none of the simulation results may be based on an availability of resources in the system to execute the changes. Thus, the system may determine to merge all simulation results if the backend system can support the merging of all changes. Changes less than the total simulation results can be made based on an amount of available resources, such as merge as much as possible.

Merge block 232 covers a merge scenario where all simulation results are merged into the backend system. Merge part block 234 covers a merge scenario where the full simulation results cannot be merged, and the simulation results are instead merged in part. Cancel block 236 represents a merge scenario where none of the results can be merged, or a scenario where a request to cancel the simulation is received. In either case, simulation results 270 are deleted. In one embodiment, even if all merge results are deleted, results processing block 230 may leave simulation object 260 available within the system. Thus, simulation results 270 may be eliminated separately from simulation object 260. Simulation object 260 can be deleted or retained when simulation results are deleted. If simulation object 260 is retained, the simulation process can recommence at the beginning.

Object query block 240 enables module 202 to monitor the status of simulation object 260, including monitoring the status of the life cycle 266 of the simulation object. Live time determiner 242 can allow object query block 240 to compare a time simulation object 260 has been "alive" against a life cycle threshold. In one embodiment, the life cycle threshold is a threshold based on a period of inactivity of the simulation object.

Snapshot module 250 enables module 202 to create a snapshot of the data of a backend system, and execute simulation activities on the snapshot data rather than the active data. Note that for practical purposes, snapshot module 250 may not copy all data in the backend system. Instead, data can be copied as an activity is requested. Thus, data can be saved on demand, and a requested activity be executed on the copy of data. Such a copy of data can enable the business context of simulation object 260 to be unique and not visible to other processes executing in system 200.

Various components described herein may be a means for performing the functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Software content (e.g., data, instructions, configuration) may be provided via an article of manufacture including a machine readable medium, which provides content that represents instructions that can be executed. The content may result in a machine performing various functions/operations described herein. A machine readable medium includes any mechanism that provides (i.e., stores and/or transmits) information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A machine readable medium may also include a storage or database from which content can be downloaded. A machine readable medium may also include a device or product having content stored thereon at a time of sale or delivery. Thus, delivering a device with stored content, or offering content for download over a communication medium may be understood as providing an article of manufacture with such content described herein.

Figure 3:
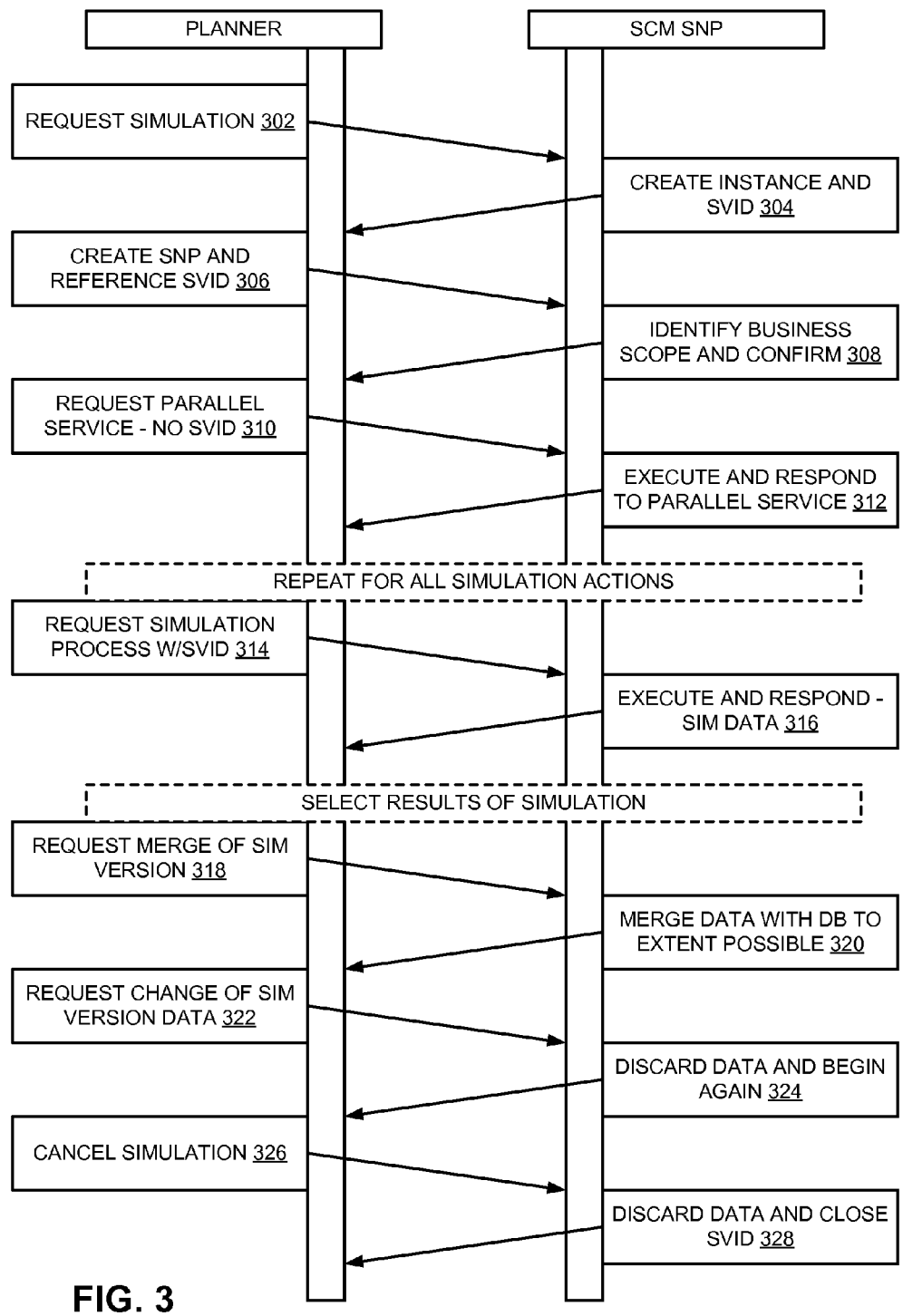
FIG. 3 is a flow diagram of an embodiment of a process for simulating activity in a supply network planning system.

FIG. 3 is a flow diagram of an embodiment of a process for simulating activity in a supply network planning system. A flow diagram as illustrated herein provides examples of sequences of various process actions. Although shown in a particular sequence or order, unless otherwise specified, the order of the actions can be modified. Thus, the illustrated implementation should be understood only as an example, and the process for establishing the secure channel can be performed in a different order, and some actions may be performed in parallel. Additionally, one or more actions can be omitted in various embodiments of the invention; thus, not all actions are required in every implementation. Other process flows are possible.

The flow diagram provides an example of interaction between a supply network planner, and a supply chain management (SCM) supply network planning (SNP) system. The planner requests a simulation, 302. The request is received at SCM SNP system, which system may invoke a simulation object function module and create a simulation object instance and SVID, 304. The SCM SNP system returns the SVID to the planner, which can then make a request to create a supply network plan. The create request is sent with reference to the SVID, 306. The request is received and processed at the SCM SNP system, which identifies the business scope and confirms the request by creating the supply network plan, 308. Identifying the business scope may include identifying where and what data is stored relative to the simulation process.

The confirmation of the supply network plan request informs the planner that the simulation process is in place, and simulation activities can be provided. Simulation activities are requested with reference to the SVID. In one embodiment, the planner can make a request to the SCM SNP system that is not associated with the business scope of the simulation object. Thus, the request can be considered to be "in parallel" to the business scope. The planner may thus make a request for a parallel service by making a request without indicating the SVID, 310. In response to the request for the parallel service, the SCM SNP system executes the service and response to the parallel service with associated data, 312. When such a parallel request is made, generally the results of any data updates are not stored in the simulation object.

When a simulation process is established, the planner can generate simulation activities or actions to execute the simulation. For all simulation actions, the planner requests a simulation process action, the request including the SVID, 314. The SCM SNP system executes the simulation process action, which generates data. The SCM SNP system responds to the request with the generated simulation (sim) data, 316. Once all simulation process actions are complete, the planner may determine whether to request merging of the data or not.

The planner can select for the results of the simulation to perform any of the following. Note that the actions illustrated will not all necessarily occur in the same simulation. Rather, what is illustrated is illustrative of the types of actions possible. In one embodiment, the planner requests a merge of the simulation version data, 318. In response to the request, the SCM SNP system merges the data to the database (db) to the extent possible, 320. That is, if all data can be merged, all data is merged. If some portion or fraction of the data can be merged, but not all the data, the portion of the data that can be merged is merged. The SCM SNP system returns a result of the merge operation, which indicates what was merged.

In one embodiment, the planner requests a change of the simulation version data, 322. That is, the planner may determine that the results of simulation were not what was wanted or not what was expected. Thus, the planner can request that the simulation version be maintained open, but that simulation results data be purged from the system. In response to the request, the SCM SNP system discards the simulation results data and begins again, 324.

In one embodiment, the planner requests that the simulation be canceled, 326. The simulation may be for testing purposes only, or the planner may determine that none of the changes are what is wanted. Thus, the simulation can be canceled upon planner request. In response to the cancel request, the SCM SNP system discards the simulation results data and closes the SVID, 328. Thus, no process is able to reference the simulation object, and the memory associated with the simulation object is reclaimed by a memory management entity.

Figure 4:
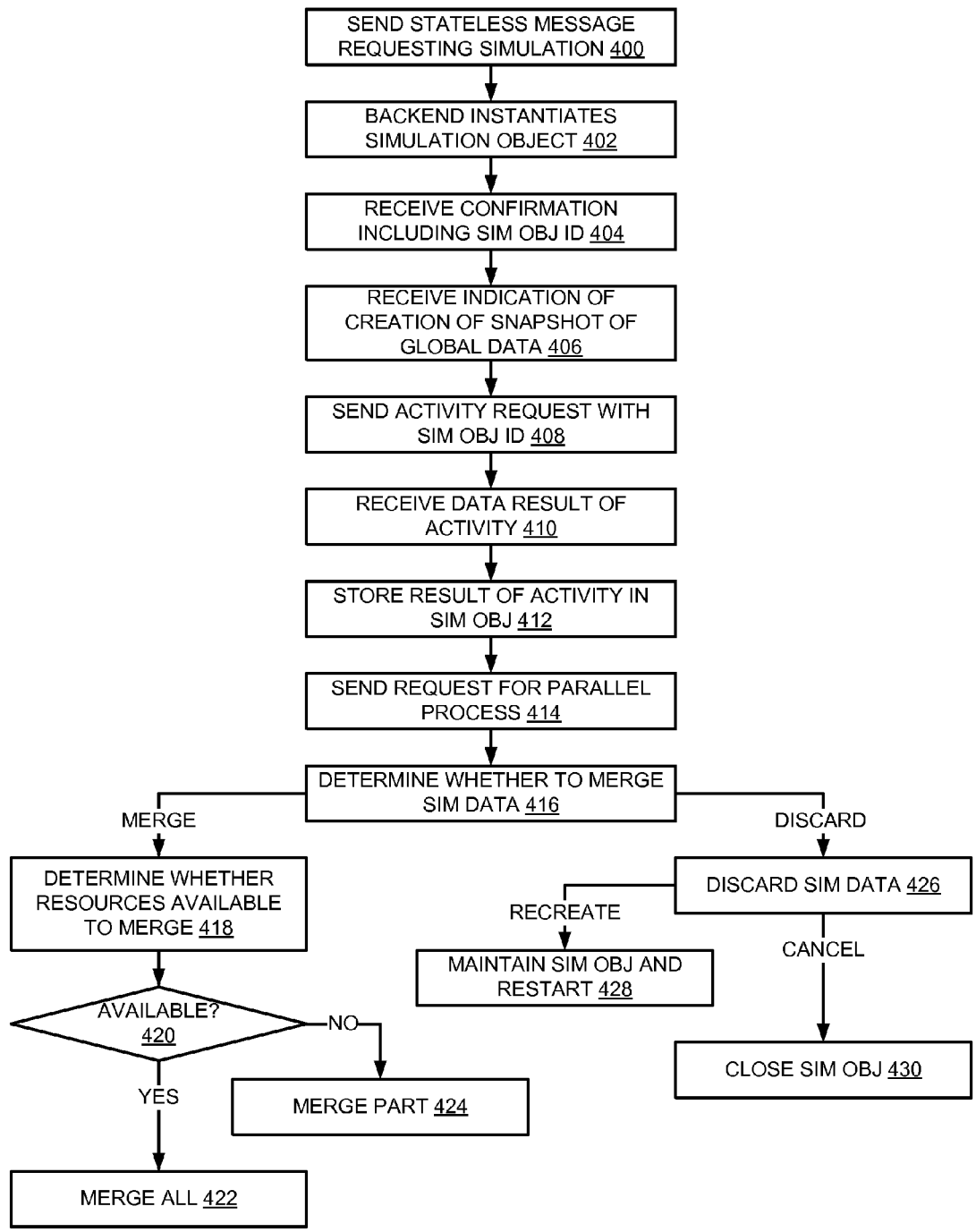
FIG. 4 is a flow diagram of an embodiment of a process for performing a simulation with a simulation business object.

FIG. 4 is a flow diagram of an embodiment of a process for performing a simulation with a simulation business object. In an enterprise system having at least one backend data system, a front end device sends a stateless message to the backend system requesting simulation, 400. The data and results of the stateless message would normally be very transitory, seeing that the data associated with the stateless message is not persisted. Responsive to the request for the simulation, the backend system instantiates a simulation object, 402. The backend system also assigns or obtains a simulation ID for the instantiated simulation object, which it returns to the front end. The front end receives the confirmation of the simulation request message from the backend, including a simulation object (sim obj) ID, 404. The simulation object ID may uniquely identify the simulation object, and be a key to accessing the business context of the simulation object.

In one embodiment, the backend system creates a snapshot of global data, which is optionally indicated to the front end, 406. The simulation can be executed on the snapshot of global data, instead of executing the simulation changes on the active backend data. Creating the snapshot may be an operation performed several times during a simulation process. For example, the backend may create a snapshot related to all affected data related to a request from the front end. The snapshot may be stored and used in the backend. The front end sends activity requests with reference to the simulation object ID, 408. The requests thus fall within the business context of the simulation object, and become part of the simulation process. The individual results of each activity become part of the simulation object and represent the overall results of the simulation process. Thus, the backend executes the activities and generates the results. The backend stores the results with the simulation object and passes the results to the front end, where the front end receives a data result of the activity, 410. The backend stores the result of the activity in the simulation object, 412.

In one embodiment, the front end sends a request for a parallel process, 414. The parallel process refers to any process outside the business context of the simulation object. The parallel process may be for a different simulation object (and a different simulation business context), or the request may simply be for some other backend service that does not become part of the simulation process. A parallel process request is made without reference to the simulation object ID.

In one embodiment, the system determines whether to merge the simulation data, 416. The determination of whether to merge can be looked at from either the backend or the front end. In the front end, the planner may decide whether to merge, and thus may decide whether to send a merge request. From the perspective of the backend, the backend may monitor for a merge request. The backend will determine to merge data responsive to such a request being received. If the decision is to merge the data, the backend system may determine whether resources are available to merge the data, 418. If resources are available to perform a complete merge, 420, the system will merge all data, 422. If resources are not available, the system will merge part (anywhere from nothing to almost all), 424, depending on what resources are available for merging the data.

If the decision is to not merge, the front end may determine to discard the data, and send a request to either start over (recreate) or end (cancel) the simulation. From the perspective of the backend, the backend may determine whether the simulation object has expired its life cycle. The backend may also receive requests to restart or end the simulation process. Thus, if the decision is to discard the data, the backend system discards the simulation data, 426. Discarding the simulation data includes purging the system of any results that may have been generated from simulation activities. If the system the discarding of the data is associated with a recreation of the simulation process, the backend system will maintain the simulation object and restart the simulation process with the same business context ID, 428. If the discard decision is associated with canceling the simulation (e.g., either an explicit request from the front end, or a timeout determination), the backend system not only discards the simulation data, but also closes the simulation object, 430.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method for simulation comprising:
    sending a stateless message to instantiate a stateful simulation object for a selected backend application of a service-oriented architecture system;
    receiving a confirmation of instantiation of the stateful simulation object, the confirmation including a simulation object identifier that identifies the stateful simulation object;
    sending a stateless activity request message that includes the simulation object identifier to cause an activity to be executed in the backend application; and
    storing a result of the execution of the activity in the stateful simulation object.

2. The method of claim 1, wherein sending the stateless activity request message that includes the simulation object identifier comprises:
    sending the stateless activity request message with the simulation object identifier in a message header.

3. The method of claim 1, wherein sending the stateless activity request message comprises:
    sending one of a sequence of stateless activity requests that each include the simulation object identifier, the inclusion of the simulation object identifier relating each stateless activity request of the sequence to a stateful simulation process.

4. The method of claim 3, wherein sending the stateless activity request of the stateful simulation process comprises:
    sending a request for a simulation activity of the stateful simulation process, where the sequence of the stateless activity requests is process-driven, and not fixed by a protocol.

5. The method of claim 1, wherein sending the stateless message to instantiate the stateful simulation object for the selected backend application comprises:
    sending the stateless message to instantiate the stateful simulation object for a backend application selected from the group consisting of a planning application, a financial system application, or an engineering system application.

6. The method of claim 1, further comprising:
    isolating the stateful simulation object from active backend data of the backend application; and
    obscuring the stored result from other processes executing in the backend application.

7. The method of claim 1, further comprising:
    optionally merging the stored result of the execution of the activity in a backend data system.

8. The method of claim 7, wherein optionally merging the stored result in the backend data system comprises:
    determining whether resources are available in a backend system associated with the backend application to merge the stored result into the active backend data; and
    merging the entire result into the active backend data if resources are available in the backend system; otherwise,
    merging part of the result into the active backend data based on an amount of resources available.

9. The method of claim 1, further comprising:
    determining whether a live time associated with the stateful simulation object has been exceeded; and
    deleting the stateful simulation object including purging the stored result data if the live time is exceeded.

10. The method of claim 1, further comprising:
creating a snapshot of global data of the backend system at the time of creation of the stateful simulation object responsive to sending the stateless message to instantiate the stateful simulation object.

11. The method of claim 10, wherein sending the stateless activity request message to cause the activity to be executed in the backend application comprises:
sending the stateless activity request message to cause the activity to be executed on the snapshot of the global data.

12. An article of manufacture comprising a non-transitory machine readable medium having content stored thereon to provide instructions to cause a machine to perform operations including:
sending a stateless message to instantiate a stateful simulation object for a selected backend application of a service-oriented architecture system;
receiving a confirmation of instantiation of the stateful simulation object, the confirmation including a simulation object identifier that identifies the stateful simulation object;
sending a stateless activity request message that includes the simulation object identifier to cause an activity to be executed in the backend application; and
storing a result of the execution of the activity in the stateful simulation object.

13. The article of manufacture of claim 12, the content to further provide instructions to cause the machine to perform operations including:
optionally merging the stored result of the execution of the activity in a backend data system.

14. The article of manufacture of claim 13, wherein the content to provide instructions for optionally merging the stored result comprises content to provide instructions for
determining whether resources are available in a backend system associated with the backend application to merge the stored result into the active backend data; and
merging the entire result into the active backend data if resources are available in the backend system; otherwise,
merging part of the result into the active backend data based on an amount of resources available.

15. The article of manufacture of claim 12, the content to further provide instructions to cause the machine to perform operations including:
creating a snapshot of global data of the backend system at the time of creation of the stateful simulation object responsive to sending the stateless message to instantiate the stateful simulation object.

16. An enterprise system comprising:
a hardware platform on which to execute a stateful simulation process for a backend data system of a service-oriented architecture system;
a simulation object function module having
a create object module to receive a stateless message requesting a stateful simulation, and instantiate a stateful simulation object and initiate the stateful simulation process on the hardware platform responsive to receiving the stateless message, wherein instantiating the stateful simulation object includes generating a simulation object identifier; and
a perform activity module to receive a stateless activity request message referencing the simulation object identifier, execute a simulation activity responsive to receiving the stateless activity request message, and store a result of the simulation activity in the stateful simulation object; and
a memory device in which the stateful simulation object is instantiated.

17. The enterprise system of claim 16, wherein the create object module is to further:
generate a unique business context for the stateful simulation object to isolate the stateful simulation object from active backend data of the backend data system; and
obscure the stored result from other processes executing in the backend data system.

18. The enterprise system of claim 16, the simulation object function module further comprising:
a results processing module to determine an amount of the stored results to merge into the backend data system, and merge the determined amount of the results.

19. The enterprise system of claim 16, the simulation object function module further comprising:
an object query module to query a status of the stateful simulation object, including determining whether a live time associated with the stateful simulation object has expired.

20. The enterprise system of claim 16, the simulation object unction module further comprising:
a snapshot module to generate a copy of data of the backend data system;
wherein the perform activity module executes the simulation activities on the copy of data of the backend data system.

* * * * *